(12) United States Patent
Shuman

(10) Patent No.: US 6,825,992 B2
(45) Date of Patent: Nov. 30, 2004

(54) SINGLE COMPONENT ASPHERIC APODIZER

(75) Inventor: Curtis A. Shuman, Colorado Springs, CO (US)

(73) Assignee: nPhase Technologies, Inc., Longmont, CO (US)

( * ) Notice: Subject to any disclaimer, the term of this patent is extended or adjusted under 35 U.S.C. 154(b) by 0 days.

(21) Appl. No.: 10/324,059

(22) Filed: Dec. 20, 2002

(65) Prior Publication Data

US 2003/0151783 A1 Aug. 14, 2003

Related U.S. Application Data

(60) Provisional application No. 60/343,308, filed on Dec. 21, 2001.

(51) Int. Cl.[7] .............................................. G02B 13/18
(52) U.S. Cl. ...................................... 359/718; 359/719
(58) Field of Search ................................ 359/719, 718, 359/35

(56) References Cited

U.S. PATENT DOCUMENTS 5,572,367 A * 11/1996 Jung et al. ................. 359/708
6,295,168 B1 * 9/2001 Hoffnagle et al. .......... 359/708

* cited by examiner

*Primary Examiner*—David N. Spector
(74) *Attorney, Agent, or Firm*—Morrison & Foerster LLP

(57) ABSTRACT

Disclosed are apodizers and methods for redistributing the intensity of a light beam. Particularly, single component apodizers are disclosed. The single component apodizers include a single lens component that is capable of redistributing the intensity of a coherent light beam.

18 Claims, 3 Drawing Sheets

—PRIOR ART—

—PRIOR ART—

SINGLE COMPONENT ASPHERIC APODIZER

This application claims the benefit of 60/343,308 filed Dec. 21, 2001.

FIELD OF THE INVENTION

The present invention relates to apodizers for redistributing the light intensity of a light beam. More specifically this invention relates to a single component apodizer that can provide a light beam with a flat-top intensity distribution.

BACKGROUND

Holographic storage systems are storage systems that use holographic storage media to store data. Holographic storage media includes photorefractive materials that can take advantage of the photorefractive effect described by David M. Pepper et al., in "The Photorefractive Effect," Scientific American, Oct. 1990 pages 62–74.

The index of refraction in photorefractive materials can be changed by light that passes through them. Holographic storage media also include photopolymers, such as those described in Coufal et al., "Photopolymers for Digital Holographic Storage" in Holographic Data Storage, 199–207 (2000), and photochromatic materials. By controllably changing the index of refraction in such materials, high-density, high-capacity, and high-speed storage of information in holographic storage media can be accomplished.

In the typical holographic storage system, two coherent light beams are directed onto a storage medium. The first coherent light beam is a data beam, which is used to encode data. The second coherent light beam is a reference light beam. The two coherent light beams intersect within the storage medium to produce an interference pattern. The storage medium records this interference pattern by changing its index of refraction to form an image of the interference pattern.

The recorded information, stored as a holographic image, can be read by illuminating the holographic image with a reference beam. When the holographic image is illuminated with a reference beam at an appropriate angle, a data beam containing the information stored is produced. Most often the appropriate angle for illuminating the holographic image will be the same as the angle of the reference beam used for recording the holographic image.

Information can be encoded within the data beam in a variety of ways. One way of encoding information into a data beam is by using an electronic mask, called a spatial-light modulator (SLM). Typically, a SLM is a two dimensional matrix of pixels. Each pixel in the matrix can be directed to transmit or reflect light, corresponding to a binary 1, or to block light, corresponding to a binary 0. The data beam, once encoded by the SLM, is relayed onto the storage medium, where it intersects with a reference beam to form an interference pattern. The interference pattern records the information encoded in the data beam to the holographic storage medium.

The information recorded in the holographic storage medium is read by illuminating the storage medium with a reference beam. The resulting data beam is then typically imaged onto a sensor, such as a Charge Coupled Device (CCD) array or a CMOS active pixel sensor. The sensor is attached to a decoder, which is capable of decoding the data.

A holographic storage medium includes the material within which a hologram is recorded and from which an image is reconstructed. A holographic storage medium may take a variety of forms. For example, it may comprise a film containing dispersed silver halide particles, photosensitive polymer films ("photopolymers") or a freestanding crystal such as iron-doped LiNbO3 crystal. U.S. Pat. No. 6,103,454, entitled RECORDING MEDIUM AND PROCESS FOR FORMING MEDIUM, generally describes several types of photopolymers suitable for use in holographic storage media. The patent describes an example of creation of a hologram in which a photopolymer is exposed to information carrying light. A monomer polymerizes in regions exposed to the light. Due to the lowering of the monomer concentration caused by the polymerization, monomer from darker unexposed regions of the material diffuses to the exposed regions. The polymerization and resulting concentration gradient creates a refractive index change forming a hologram representing the information carried by the light.

FIG. 1 illustrates the basic components of a holographic system 100. System 100 contains a SLM 112, a holographic storage medium 114, and a sensor 116. SLM 112 encodes beam 120 with an object image. The image is stored by interfering the encoded data beam 120 with a reference beam 122 at a location on or within holographic storage medium 114. The interference creates an interference pattern (or hologram) that is captured within medium 114 as a pattern of, for example, a holographic refractive index grating.

It is possible for more than one holographic image to be stored at a single location, or for a holographic image to be stored at a single location, or for holograms to be stored in overlapping positions, by, for example, varying the angle, the wavelength, or the phase of the reference beam 122, depending on the particular reference beam employed. Data beam 120 typically passes through lenses 130 before being intersected with reference beam 122 in the medium 114. It is possible for reference beam 122 to pass through lenses 132 before this intersection. Once data is stored in medium 114, it is possible to retrieve the data by intersecting a reference beam 122 with medium 114 at the same location and at the same angle, wavelength, or phase at which a reference beam 122 was directed during storage of the data. The reconstructed data beam passes through one or more lenses 134 and is detected by sensor 116. Sensor 116, is for example, a charged coupled device or an active pixel sensor. Sensor 116 typically is attached to a unit that decodes the data.

Typically, the data beam and reference beams are provided using a laser illumination system. Beams of light produced by a laser typically have an intensity profile that can be approximated by a Gaussian distribution in which the intensity of the beam varies across the width of the beam (being brightest in the middle and dimmer on the edges).

Accurate data retrieval requires optimal thresholding and detection of the data elements (pixels) by the sensor device. If the reconstructed pixels are not uniform in intensity, the electronics for the sensor will be more complex and less likely to achieve the minimum possible error rate. This will add to the overhead required in the error correction scheme and will ultimately reduce the achievable data capacity of the data storage device.

It is therefore preferred that all of the pixels of the reconstructed data beam have the same intensity. The intensity of the pixels of the reconstructed data beam is dependent upon both the intensity distribution of the light beams used to record the holographic images and upon the intensity distribution of the reference beam used to produce the reconstructed data beam. If the intensity distribution of the data beam encoded by the SLM has a greater intensity in the middle of the data beam, the pixels illuminated by the middle of the data beam will be recorded with a greater intensity than the pixels illuminated by the edges of the data beam. Similarly if the reference beam used to produce the reconstructed data beam has a greater intensity in the middle of the reference beam, the middle of the holographic image will be illuminated with a greater intensity than the pixels stored toward the edge of the hologram. Consequently, using light beams that have a variable intensity distribution to record and reproduce images can produce a reconstructed data beam in which the intensity of the pixels varies within the beam.

Accordingly, a need exists for optical systems that can change the intensity profile of a beam of light to produce a beam of light that has little intensity variance. One approach to producing a light beam with less variance is to over-expand the laser beams and then use only the central part of the beam. The intensity of the center part of a laser beam typically has less variation than the rest of the beam. This approach, however, is inefficient since a large amount of the laser light power is unused. Consequently, more powerful lasers are required to make up for the unused energy.

A more efficient approach to changing the intensity profile of a beam of light is to expand the beam in a nonlinear way, such that light intensity is redistributed within its aperture. Optical systems for redistributing a beam of light in such a way are know as apodizers. Two common types of apodizer systems are known. The first type of apodizer is the Keplerian apodizer. A Keplerian apodizer comprises two positive lens components, with an internal focal plane between the two lens components.

FIG. 2 shows an example of a typical Keplerian apodizer. The Keplerian apodizer shown in FIG. 2 has two lens components 202 and 206. First lens component 202 refracts the light beams 200 towards internal focal plane 204. The refracted light beams 200 then continue toward second lens component 206. Once the light beams 200 have the proper intensity distribution, second lens component 206 recollimates the light beams 200. A Keplerian apodizer is described in detail in John A. Hoffnagle, C. Michael Jefferson, "Design and performance of a refractive apodizer that converts a Gaussian to a flat-top beam," Appl. Opt., 39, 5488–5499 (2000).

A second type of apodizer system is the Galilean apodizer. The Galilean design comprises a negative diverging lens followed by a positive collimating lens. FIG. 3 shows an example of a typical Galilean apodizer. First lens component 302 refracts the light rays 300 toward the surface of second lens component 304. Once the light rays 300 have the proper intensity distribution, second lens component 304 recollimates the light rays 300. The Galilean apodizer, unlike the Keplerian apodizer, does not have an internal focal plane. A Galilean apodizer is described in detail in J. L. Kreuzer, "Coherent light apodizer yielding an output beam of desired intensity distribution at a desired equiphase surface," U.S. Pat. No. 3,476,463 (Nov. 4, 1969).

The prior art apodizing systems have the drawback of requiring multiple lens components. When multiple lens components are used, the alignment of the various components becomes important, making these designs difficult to fabricate and less robust.

SUMMARY OF THE INVENTION

Disclosed are apodizers and methods for redistributing the intensity of a light beam. A preferably apodizer is a single component lens that can convert a light beam with a Gaussian intensity distribution into a light beam with a flat-top intensity distribution.

In one embodiment the method of redistributing the intensity of a collimated beam of light comprises projecting a collimated beam of light through a single component lens having two aspheric surfaces. The single component lens produces a collimated beam of light with a flat-top intensity distribution.

Preferably, the collimated beam of light with a flat-top intensity distribution is projected onto a holographic storage medium or an encoding device. Preferably, a laser produces the collimated beam of light.

Preferably, the single component lens is a single element lens. Preferably, at least 75% of the intensity of the projected light beam is incident upon the single component lens. Preferably, the single component lens has an axial thickness divided by a selected beam diameter of less than 20.

In another embodiment the single component lens for redistributing the intensity of a collimated beam of light comprises a first surface that refracts a collimated light beam entering the single component lens and a second surface that recollimates the refracted light beam. The light beam has a first intensity profile when entering the single component lens and a second intensity profile when exiting the single component lens.

Preferably, the single component has a coupling section that connects the first surface and the second surface. Preferably, the first surface causes light rays within the collimated light beam entering the single component lens to diverge. Preferably, the first surface has a negative radius of curvature.

Preferably, the single component lens has an axial thickness measured from a vertex of the first surface to a vertex of the second surface, the light beam has a selected beam diameter, and the axial thickness divided by the selected beam diameter is less than 20.

Preferably, the first intensity profile is a Gaussian profile and the second intensity profile is a flat-top intensity profile. Preferably, the single component lens has only a single lens element. Preferably, the first surface and the second surface are aspheric.

BRIEF DESCRIPTION OF THE DRAWING

The invention will be better understood by reference to the Detailed Description of the Invention when taken together with the attached drawings, wherein.

DETAILED DESCRIPTION OF THE INVENTION

Figure 1:
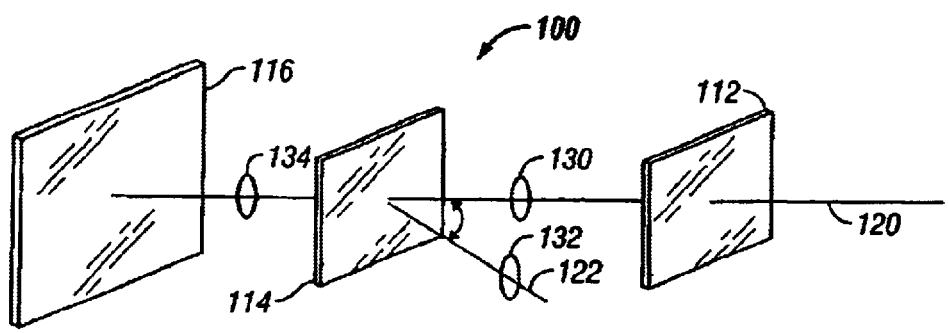
FIG. 1 is a holographic storage and retrieval system.
Figure 2:
FIG. 2 is an earlier Keplerian apodizer.
Figure 3:
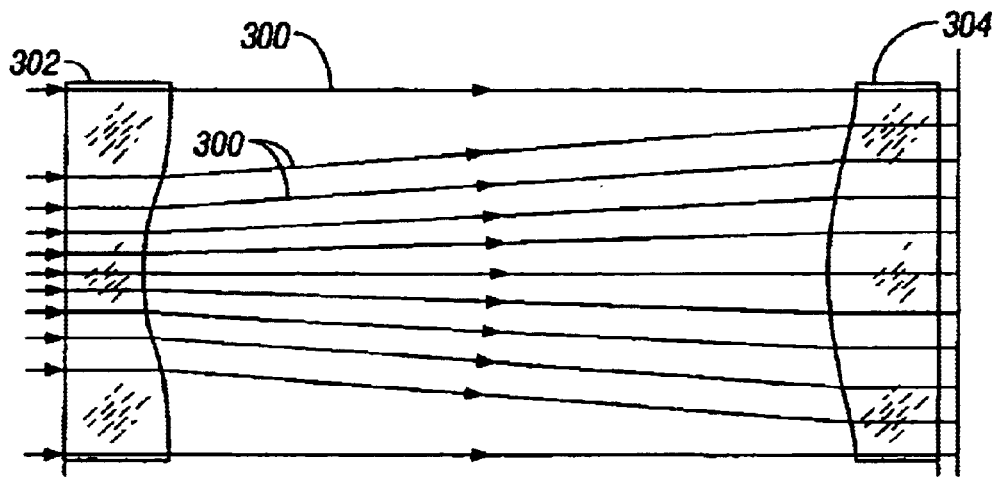
FIG. 3 is an earlier Galilean apodizer.

Typically light beams produced by a coherent light source, such as a laser, have an uneven intensity distribution. For example, the light produced by a laser typically has an intensity profile that can be approximated by a Gaussian distribution in which the intensity of the beam is most intense in the center portion of the beam. In many applications, for example holographic storage systems, a light beam with a more uniform intensity distribution is desirable.

Described are apodizers that redistribute the intensity of a light beam. Particularly, single component apodizers are disclosed. The single component apodizers include a single lens component that is capable of redistributing the intensity of a coherent light beam.

The disclosed apodizers can be used for a variety of applications where a light beam having a uniform intensity distribution is preferred. A preferred application for the disclosed apodizers is in holographic data storage systems (HDSS).

An HDSS is composed of an apodizer that directs and shapes coherent optical beams to intersect at a surface or volume where the interference pattern is recorded. The hologram constitutes the recorded pattern in the media.

In HDSS, an entire page of information is stored at once as an optical interference pattern within a holographic storage medium by intersecting two coherent laser beams within the holographic storage medium. The first beam is called the "data beam," which contains the information to be stored. The second beam is called the "reference beam."

The interference pattern generated by the two beams is recorded in the material in the form of a hologram. The ratio of the intensity of the reference beam and the data beam at any point of overlap in the media controls the localized recording rate of the hologram. If the reference beam intensity varies over the media volume, then the quality of the hologram is degraded as different positions in the media record at different rates.

In an HDSS system, the data beam is typically encoded using an encoding device such as an SLM. Typically, a SLM is a two dimensional matrix of pixels. Preferably, the light intensity of each pixel encoded is dependent only upon whether the pixel is directed to transmit/reflect light or block light and does not vary with the placement of the pixel in the data beam. If the intensity of the data beam varies, each pixel will not be recorded with the same intensity, which makes decoding the pixels more difficult.

Data retrieval in an HDSS system uses a reference beam to reconstruct the data beam. Again, variance in the intensity of the reference beam degrades performance. Accordingly, the reference beam and data beams (prior to being encoded) preferably have a uniform intensity profile. The following apodizers can be used to produce light beams with a uniform intensity distribution from light beams with an uneven intenisty distribution.

Preferably, the HDSS produces a planar reference beam. A "planar beam" is a beam that is characteristic of light emitted from a point source at infinity. In a planar beam, the propagating beam has a wavefront of plane waves propagating in a single direction.

In one embodiment, a light beam produced by a laser is projected through an apodizer that corrects the intensity of the beam. A beam splitter then produces a separate data beam and reference beam. The data beam is then encoded using an encoding device such as an SLM. The reference beam is projected onto a scanning mirror. The scanning mirror can then be used to reflect the reference beam through a scanning system that directs the reference beam onto the surface of a holographic storage medium.

In an alternative embodiment, the reference beam is projected through an apodizer and the data is projected through a different apodizer. This configuration could allow different beam sizes and collection efficiencies to be used for each beam.

Preferably, the light beams entering and exiting the apodizer are collimated. A collimated beam is a beam in which the rays are nearly parallel so that the beam does not converge or diverge appreciably. A laser is a preferable source of collimated light.

Figure 4:
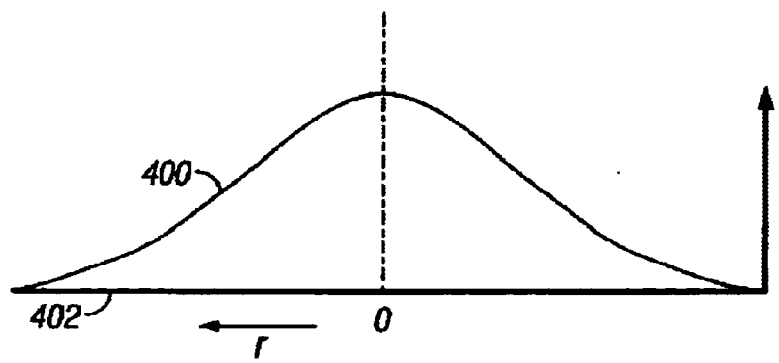
FIG. 4 is a diagram of a Gaussian intensity distribution of a beam of light as a function of incident radius.

The intensity of a beam of light produced by a laser can often be closely approximated by a Gaussian or "normal" distribution. FIG. 4 shows a Gaussian intensity distribution 400, representing the intensity of a beam of light incident on the surface of an apodizer as a function of radius r the optical axis 402 of the lens element of the apodizer. The intensity may be written according to the following formula 1:

$$I(r) = e^{-\left(\frac{r}{a}\right)^2} \text{ for } r < R \tag{1}$$

The expression I(r) indicates that I is a function of r; e is the base of the Naperian logarithms; and a is a constant which is a scale factor. The equation applies for values less than R, which is the radius of the lens element of the apodizer. For radii greater than R, I is zero.

Since the Gaussian function theoretically goes on to infinity, the diameter of the beam being changed by the apodizer is limited by the diameter of the apodizer (the diameter of the lens element upon which the beam is incident). The diameter of the apodizer, can be chosen by choosing an efficiency for the system. The efficiency of the system is defined as how much of the input intensity is to be transformed by the system. For an efficiency of 50%, a diameter for the apodizer is chosen so that 50% of the beam's energy is incident upon the surface of the apodizer. A more efficient apodizer allows for less of the beam's energy to be wasted, but requires a larger diameter for the apodizer.

Preferably, the efficiency of the apodizer is at least about 75%. More preferably, the efficiency of the apodizer is at least about 85%. Most preferably, the efficiency of the apodizer is at least about 90%.

Typically a light beam with a Gaussian distribution has light rays near the center of the beam spaced closer together than those near the edges of the beam. This means that the intensity of the light beam is greater towards the center of the beam than near the edges of the beam. To produce an output beam with a more uniform distribution, the apodizer preferably bends the rays toward the center portion to a greater extent than those near the edges.

Preferably, the apodizer produces an output beam with a flat-top intensity distribution. A flat-top intensity distribution is a distribution in which all rays in the output beam have about equal spacing, representing equal energy in each area of the beam.

A preferred apodizer for redistributing the light intensity of a light beam is a single component lens. A single-component lens is a single lens element or two or more lens elements that are all held together in optical contact. Preferably, the single-component lens has one or two lens elements.

A single component is easier to manufacture and is more robust than a multiple component design. If multiple components are used, the spacing between the lens components becomes important. Properly aligning these multiple lens components can be difficult and the lens components can fall out of alignment with use.

Preferably, the single component lens is a single element lens. A single component, single element lens can be more easily fabricated than multiple element designs since proper attachment of the various lens elements is unnecessary and the number of optical surfaces that need to be formed is limited.

A single component, single element design has two optical surfaces that can be manipulated to shape a beam of light and a coupling region that couples light from the first lens surface to the second lens surface. The first surface is the entrance surface where a beam of light enters the single component lens. The coupling region is the region between the first lens surface and the second lens surface. The second surface is the exit surface where the beam of light leaves the single component lens.

Preferably, the apodizer is a Galilean apodizer. In a Galilean design, the rays of a beam of light are caused to diverge from one another without an intermediate focal plane within the apodizer. For a beam of light with a Gaussian distribution, the center of the beam of light is more intense than the outside of the beam. Accordingly, to form a more uniform beam of light using a Galilean apodizer, the light beams toward the inside of the beam are preferably caused to diverge toward the outside of the beam at a steeper angle than the rays toward the edge of the beam.

To cause the light beams to diverge from one another the first aspheric surface refracts an incident light beam and causes the beam to uncollimate. Assuming a Gaussian light beam is to be transformed into a light beam with a flat-top distribution the first aspheric surface causes the light rays toward the center of the beam to bend at a steeper angle than the light rays toward the edge of the beam. Preferably, this is accomplished by having a lens surface with a smaller absolute value radius of curvature toward the center of the surface than the absolute value radius of curvature of the edges of the lens surface.

As the light rays travel through the coupling section they continue to diverge from one another. The length of the coupling section is the axial thickness of the lens and is chosen to achieve the desired intensity distribution. The axial thickness of the single component lens is the distance from the vertex of the first aspheric surface of the lens to the vertex of the second aspheric surface of the lens. Preferably, the axial thickness of the single component lens is minimized to provide a compact path length for the light beam. The axial thickness of the single component lens is preferably balanced with the difficulty of bending light at steeper angles accurately.

The relationship between the axial thickness of the single component lens and the difficulty of bending light steeper angles can be established by controlling the ratio of the axial thickness of the single component lens and the selected beam diameter. A beam with a larger beam diameter preferably uses a larger diameter lens so that the angle in which the light rays are bent stays relatively constant. The selected beam diameter is the diameter of the beam having the chosen efficiency. For example, if the single component lens is to have an efficiency of 70%, the selected beam diameter is the diameter of the input beam having 70% of the total intensity of the input beam.

Preferably, to obtain a compact path length for the light beam, the axial thickness of the single component lens divided by the selected beam diameter is less than 20. More preferably, the axial thickness of the single component lens divided by the selected beam diameter is less than 10. Most preferably, the axial thickness of the single component lens divided by the selected beam diameter is less than 5.

The second aspheric surface of the single component lens preferably: 1) recollimates the light beam; and 2) corrects distortion of the light beam. Since the light rays toward the center of the beam are bending at a steeper angle than the light rays toward the edges of the light beam, the light rays toward the center of the beam are preferably bent to a larger extent than the light rays toward the edge of the light beam.

Preferably, the distortion of the beam produced by the apodizer is minimized. Distortion can be quantified in terms of peak-to-valley wavefront error measured in wavelengths of the transmitted light. Limiting the distortion of the beam passing through the apodizer is important for at least two reasons.

First, distortion of the wavefront can decrease the quality of the image produced by the apodizer. In a holographic storage system, distortion of a beam can decrease the quality of the interference pattern produced by the storage system.

Second, minimizing the distortion of the wavefront is also important for creating a reproducible beam of light. In a HDSS a reproducible reference beam is preferable because a reference beam that is the same or similar to the reference beam used to create the interference pattern is typically used to reproduce the data beam from the interference pattern during the readout process. Accordingly, any distortion of the reference beam due to the apodizer should be reproducible. By minimizing the amount of distortion, reproducibility of the reference beam is typically improved.

The size of the output beam can be the same size as the input beam or can be larger than the size of the input beam. An output beam with a larger size can be obtained by allowing the rays of the beam to diverge until the proper spacing and width of the beam is obtained.

Preferably, the apodizer is designed to minimize the amount of distortion measured in the amount of wavefront error. Preferably, the apodizer can correct wavefront error below the diffraction limit of 0.25 waves. Preferably, the apodizer is designed to minimize or prevent any lateral shift of the beam of light passing through the apodizer.

The apodizer can be made from any type of material that can be shaped into aspheric elements. Preferably, the apodizer is made from an optical glass.

EXAMPLE 1

Figure 5:
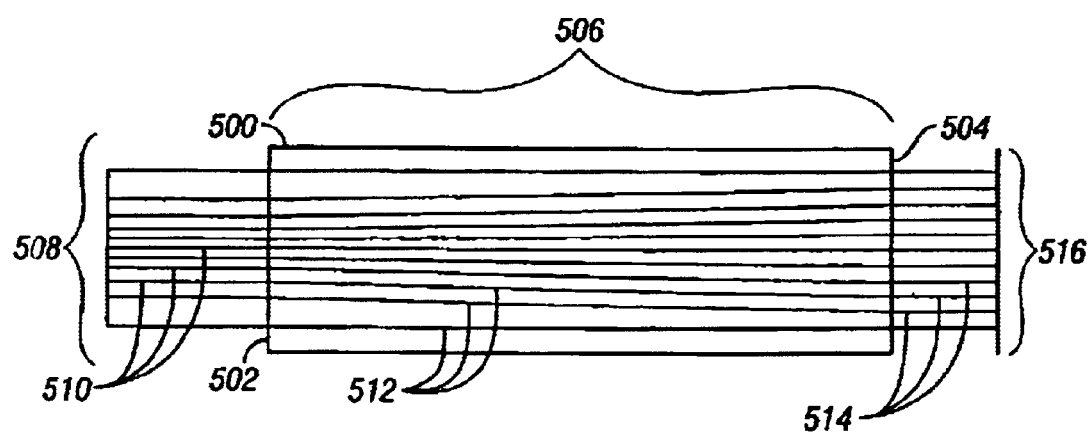
FIG. 5 is one embodiment of a single component apodizer according to an embodiment of the present invention.

FIG. 5 shows a single component lens 500 having a single lens element for changing a 3 mm input light beam 508 with a Gaussian distribution into a 3 mm output beam 516 with a flat-top distribution. Lens component 500 is a single lens element having a diameter of 4.0 mm and is made out of BK7, a lens material available from Schott Glass Technologies, Inc. Single component lens 500 has a first aspheric surface 502 and a second aspheric surface 504 and a coupling region 506. The first aspheric surface 502 takes collimated light rays 510 having a wavelength of 445 nm and having a Gaussian distribution and decollimates the light rays. The decollimated light rays 512 diverge from one another as they travel through coupling region 506. Once the decolimated light rays 512 obtain a flat-top intensity distribution, second aspheric surface 504 recollimates them and corrects wavefront error, producing collimated light rays 514 having a flat-top intensity distribution.

The lens 500 was designed using a ray trace program Zemax-EE®, an optical design program available from Focus Software Inc. The lens component 500 was designed as a single lens element with aspheric surfaces 502 and 504. The prescription parameters (radius of curvature, conic constant, aspheric coefficients) of the aspheric surfaces 502 and 504 were the variables to be optimized. The axial thickness of coupling region 506 was chosen as a compromise between the desire for a compact path length and the difficulty of bending light at steeper angles. An axial thickness for coupling region 506 of 12 mm was chosen for a 3 mm selected beam diameter.

A set of 11 input rays 510 mathematically derived to have 90% of the intensity of a Gaussian beam were used to model the input beam 510. The software program was directed to optimize the design of the lens with respect to two criteria: 1) minimizing the wavefront error of the exit beam; and 2) the rays in the defined ray set should finish with a flat-top distribution. The design was allowed 1 minute of angular error, to produce a design with workable alignment tolerances. The characteristics of lens 500 are summarized in Table 1 below:

TABLE 1

| Surface # | Radius(mm) | Axial Thickness/t | Glass |
|---|---|---|---|
| 502 | −7.785** | 12.0(y = 502, x = 505) | BK7 |
| 504 | −11.898** | | |

*t = distance between positions y and x, wherein x and y are positions in FIG. 4.
**The aspheric coefficients are:
Surface 502: k = 0  a4 = 0.0226  a6 = −0.00345  a8 = 0.000283
Surface 504: k = 0  a4 = 0.00440  a6 = 0.000234  a8 = 0.000268

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire invention of the patents and publications referred in this application are hereby incorporated herein by reference.

What is claimed is:

1. A method of redistributing the intensity of a collimated beam of light comprising:
projecting a collimated beam of light through a single component lens having two aspheric surfaces, wherein the single component lens produces a collimated beam of light with a flat-top intensity distribution.

2. The method of claim 1, further comprising projecting the collimated beam of light with a flat-top intensity distribution onto a holographic storage medium.

3. The method of claim 1, further comprising projecting the collimated beam of light with a flat-top intensity distribution onto an encoding device.

4. The method of claim 1, wherein a laser produces the collimated beam of light.

5. The method of claim 1, wherein the single component lens is a single element lens.

6. The method of claim 1, wherein at least 75% of the intensity the projected light beam is incident upon the single component lens.

7. The method of claim 1, wherein single component lens has an axial thickness divided by a selected beam diameter of less than 20.

8. A single component lens for redistributing the intensity of a collimated beam of light comprising:
a first surface that refracts a collimated light beam entering the single component lens; and
a second surface that recollimates the refracted light beam,
wherein the light beam has a first intensity profile when entering the single component lens and a second intensity profile when exiting the single component lens.

9. The single component lens of claim 8, further comprising a coupling section that connects the first surface and the second surface.

10. The single component lens of claim 8, wherein the collimated light beam entering the single component lens is produced by a laser.

11. The single component lens of claim 8, wherein the first surface causes light rays within the collimated light beam entering the single component lens to diverge.

12. The single component lens of claim 8, wherein the first surface has a negative radius of curvature.

13. The single component lens of claim 8, wherein at least 75% of the intensity the project light beam is incident upon the single component lens.

14. The single component lens of claim 8, wherein the single component lens has an axial thickness measured from a vertex of the first surface to a vertex of the second surface, the light beam has a selected beam diameter, and the axial thickness divided by the selected beam diameter is less than 20.

15. The single component lens of claim 8, wherein the first intensity profile is a Gaussian profile.

16. The single component lens of claim 8, wherein the second intensity profile is a flat-top intensity profile.

17. The single component lens of claim 8, wherein the single component lens has only a single lens element.

18. The single component lens of claim 8, wherein the first surface and the second surface are aspheric.

* * * * *

UNITED STATES PATENT AND TRADEMARK OFFICE
CERTIFICATE OF CORRECTION

PATENT NO. : 6,825,992 B2
DATED : November 30, 2004
INVENTOR(S) : Shuman

It is certified that error appears in the above-identified patent and that said Letters Patent is hereby corrected as shown below:

Title page,
Item [73], Assignee, please change "nPhase Technologies, Inc." to
-- InPhase Technologies, Inc. --

Signed and Sealed this

Nineteenth Day of April, 2005

JON W. DUDAS
*Director of the United States Patent and Trademark Office*